United States Patent [19]

Kablaoui et al.

[11] 3,879,306
[45] Apr. 22, 1975

[54] AUTOMATIC TRANSMISSION FLUID
[75] Inventors: Mahmoud S. Kablaoui; Robert E. Reid, both of Wappingers Falls; Arthur W. Godfrey, Fishkill, all of N.Y.
[73] Assignee: Texaco Inc., New York, N.Y.
[22] Filed: Nov. 5, 1973
[21] Appl. No.: 413,101

[52] U.S. Cl. .............................. 252/51.5 A; 252/77
[51] Int. Cl. ....................... C10m 1/36; C10m 1/32
[58] Field of Search ...................... 252/51.5 A, 77

[56] References Cited
UNITED STATES PATENTS
3,272,746  9/1966  Le Suer et al. ................... 252/47.5
3,634,256  1/1972  Bickham ............................ 252/75
3,796,663  3/1974  Hotten ........................... 252/51.5 A FOREIGN PATENTS OR APPLICATIONS
984,409  2/1965  United Kingdom

*Primary Examiner*—W. Cannon
*Attorney, Agent, or Firm*—Thomas H. Whaley; Carl G. Ries

[57] ABSTRACT

Automatic transmission fluid composition and concentrates thereof comprising a major amount of a lubricating oil and a friction modifying amount of an N-(hydroxyalkyl) alkenyl succinamic acid or a mixture of N-(hydroxyalkyl) alkenyl succinamic acid and N-(hydroxyalkyl) alkenyl succinimide. In addition, a method of operating an automatic transmission having friction sensitive power transmitting means employing the aforedescribed automatic transmission fluid composition.

3 Claims, No Drawings

AUTOMATIC TRANSMISSION FLUID

BACKGROUND OF INVENTION

The demand for improved performance of automatic transmission fluids spurs a continuing search for new additives and lubricating oil formulations to achieve the desired goals. An automatic transmission is a complex hydraulic mechanism having friction sensitive power transmitting means which incorporates the function of a torque converter, wet clutches and planetary gearing in a relatively compact sealed unit. This device requires a transmission fluid which provides lubricity, extreme pressure and dispersant properties as well as carefully selected frictional properties. In addition, the fluid must not be corrosive to copper alloys or in any way deleterious to the synthetic seals in the transmission. Another requirement for the fluid is that it maintain good lubricity and friction modifying properties under the prolonged high shear, high temperature conditions encountered in this environment.

Carboxylic acids and their derivatives are widely employed as lubricity agents for friction modifiers in mineral based automatic transmission fluids. These lubricity agents provide commercial automatic transmission fluids having good service life. However, the industry is continually searching for friction modifying additives which have improved stability properties and thereby increase the operational life of the automatic transmission fluid. A breakdown in the stability of the friction modifier is indicated by a rising coefficient friction in the transmission fluid and by an early onset of erratic or harsh shifting in service and in automatic transmission tests.

One such improved automatic transmission fluid of improved stability is described in U.S. Pat. No. 3,687,852 which contains substituted aspartamides of the formula:

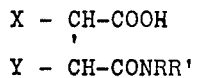

where R and R' are aliphatic hydrocarbon of from 1 to 30 carbons and X and Y are alternatively hydrogen or RR'N as an improved friction modifier.

SUMMARY OF INVENTION

We have discovered and this constitutes our invention an automatic transmission fluid having even further improved friction modifier stability. Specifically, the novel transmission fluid including the concentrate thereof comprises at least about 50 wt. % of a mineral oil of lubricating viscosity and between about 0.01 and 50 wt. % of a N-(hydroxyalkyl) alkenyl succinamic acid or a mixture of N-(hydroxyalkyl) alkenyl succinamic acid and N-(hydroxyalkyl) alkenyl succinimide, the amic acid to imide weight ratio being between about 1:0.01 and 1:1.5 represented by the formulas:

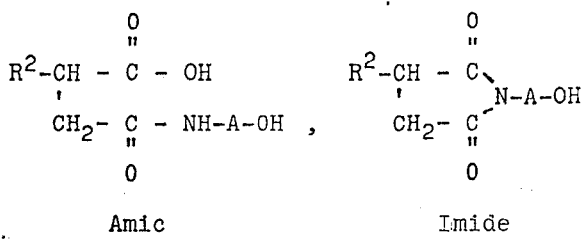

where $R^2$ is alkenyl of from 10 to 30 carbons and A is a divalent saturated aliphatic hydrocarbon radical of from 1 to 6 carbons.

The novel method of the invention comprises operating an automatic transmission having friction sensitive power transmitting means by supplying to the mechanism the above described transmission fluid.

DETAILED DESCRIPTION OF THE INVENTION

As heretofore stated the automatic transmission fluid of the invention and concentrates thereof comprise at least 50 wt. % of a hydrocarbon oil of lubricating viscosity and from about 0.01 to about 50 wt. % of a succinamic acid or a mixture of succinamic acid and succinimide friction modifier. The automatic transmission fluid concentrate contemplated herein will comprise between about 50 and 85 wt. % of mineral base oil and between about 5 and 50 wt. % of the succinamic acid or succinamic acid-succinimide mixture friction modifier. In the finished formulations which are normally prepared by dilution of the concentrates with additional mineral oil the lubricating oil base comprises at least about 85 wt. % of the finished formulation and the friction modifier represents between about 0.01 and 5 wt. % of the formulation. The concentrate is the form normally employed for bulk shipment and/or storage of product and is diluted to the finished form for use.

The succinamic acid friction modifier can be prepared by reacting an alkene of from 10 to 30 carbons with maleic anhydride aproximately on an equimole basis, generally at a temperature of between about 75° and 100°C., preferably in an inert atmosphere, utilizing an inert liquid solvent, if necessary, to render the reaction mixture fluid, for a period of normally between about 2 and 10 hours to form alkenyl succinic anhydride characterized by the formula:

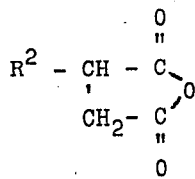

where $R^2$ is as heretofore defined.

As a next step, the formed alkenyl succinic anhydride is contacted with an alkanolamine characterized by the formula $H_2N$—A—OH where A is a divalent aliphatic hydrocarbon of 1 to 6 carbons and, preferably in the additional presence of a mineral lubricating oil of automatic transmission fluid quality at a temperature between about 50° and 100°C., preferably in an inert gas atmosphere, utilizing an anhydride to alkanolamine mole ratio of about 1:1. At the end of the reaction, the final product is desirably filtered and the inert solvent, if employed, removed as overhead.

When a mixture of succinamic acid and succinimide mixture is desired, the aforementioned procedure is modified by heating the mixture of alkanolamine, alkenyl succinic anhydride and mineral oil at a temperature of between about 100° and 140°C.

Examples of the suitable alkene reactants are decene, dodecene, tetradecene, octadecene and tricosene.

Examples of the alkanol amine reactants are monoethanolamine, 1,2-propanolamine, 1,3-propanolamine, 1,2-butanolamine, 1,3-butanolamine and 1,4-butanolamine.

Suitable inert solvents are benzene, toluene, xylene, isooctane and heptane.

The inert gas normally employed is nitrogen.

Example of the succinamic products, alone or in the succinamic-succinimide mixtures are N-(2-hydroxyethyl)-n-tetradecenyl succinamic acid, N-(3-hydroxypropyl)-n-tetradecenyl succinamic acid, N-(2-hydroxypropyl)-n-tetradecenyl succinamic acid, N-(4-hydroxybutyl)n-dodecenyl succinamic acid, N-(3-hydroxybutyl)-n-octadecenyl succinamic acid, N-(2-hydroxybutyl)-t-dodecenyl succinamic acid, N-(2-hydroxyethyl)-n-decenyl succinamic acid and N-(2-hydroxyethyl)-n-octadecenyl succinamic acid.

Examples of the succinimide components in the succinamic-succinimide mixtures are N-(2-hydroxyethyl)-n-tetradecenyl succinimide, N-(2-hydroxypropyl)-n-tetradecenyl succinimide, N-(3-hydroxypropyl)-n-tetradecenyl suecinimide, N-(4-hydroxybutyl)-n-dodecenyl succinimide, N-(2-hydroxybutyl)-n-octadecenyl succinimide, N-(2-hydroxyethyl)-n-octadecenyl succinimide and N-(2-hydroxyalkyl)-n-tricosenyl succinimide. It is to be noted that in the succinimide-succinamic mixtures the amide and imide components will be the corresponding amic and imide versions of one another.

The finished automatic transmission fluid of the invention will generally be a formulated fluid containing minor amounts of the conventional additives. For example, the automatic transmission fluid can contain in addition to the contemplated friction modifiers between about 0.5 and 5 wt. % of an ashless dispersant such as the succinimide reaction product of a polyalkylene polyamine and $C_{50}^+$ alkenyl succinic anhydride, between about 0.5 to 8 wt. % of mixed alkyl esters of methacrylic acid having molecular weights above 25,000 as VI improvers; between about 0.1 to 5 wt. % of a zinc dialkyl or diaryl dithiophosphate as a wear inhibitor; between about 0.1 and 5 wt. % alkyl or aryl substituted phenyl or naphthyl amine as corrosion inhibitor; 0.1 to 5 wt. % of a bis alkyldithiothiadithiazole as an antioxidant; and between about 0.1 and 5 wt. % alkali metal alkyl or alkaryl sulfonate as demulsifier. The aforementioned conventional additives are listed as merely typical. Equivalent additives thereof are also contemplated.

The automatic transmission fluid of the invention is generally characterized by an SUS viscosity at 210°F. of between about 49 to 60, a viscosity index of at least about 150 and pour point below −40°F. and meets the essential Dexron specifications set by General Motors for automatic transmission fluids.

The mineral lubricating oil base which constitutes at least 85 wt. % of the finished composition is a refined oil or a mixture of refined oils selected according to the viscosity requirements of the particular service. For automatic transmissions where the requirements include an SUS viscosity of the compounded oil at 210°F. of 49 minimum up to 60 and at 0°F. of 7000 maximum (extrapolated) the base oil or the major component thereof is generally a distilled oil lighter than an SAE 10 Motor Oil, such as one having an SUS viscosity at 100°F. less than 150 and generally between 50 and 125. Example distillate fractions are paraffinic distillate or combinations of paraffinic/naphthenic distillates. The flash point of the distillate component of the base oil will generally be substantially above 300°F., if the distillate fraction constitutes the entire base oil, its flash point will usually be above 350°F.

A particularly preferred base oil comprises approximately 70 to 95 wt. % of a refined distillate oil and 5 to 30 wt. % of a refined residual fraction which imparts desired high flash point and lubricity to the base oil. A specifically preferred residual fraction comprises a paraffin base residuum which has been propane deasphalted and subjected to centrifuge dewaxing having an SUS viscosity at 210°F. below about 250. An effective base oil mixture comprises 85 wt. % of a furfural refined, acid treated clay contacted, solvent dewaxed paraffin base distillate having an SUS viscosity at 100°F. of 100, a viscosity index of about 100, a flash above 385°F. and a pour point about +10°F., and 15 wt. % of an acid treated naphthenic base distillate having an SUS at 100°F. of 60, a flash above 300°F., a pour point below 40°F.

A viscosity index improvement of the formulated finished automatic transmission fluid of the invention is normally effected with a methacrylate ester polymer having the formula:

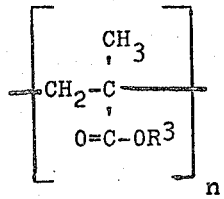

where $R^3$ is an alkyl group, a dialkylaminoalkyl group, or a mixture of such groups containing from 1 to 20 carbons and n is an integer providing a molecular weight of the polymer in the range of 25,000 to 1,250,000 and preferably 35,000 to 200,000. Methacrylate ester polymers possessing pour depressant and viscosity index improving properties are well known, e.g., U.S. Pat. No. 2,737,496. Very effective material of this type is a copolymer of the lower $C_4$–$C_{14}$ alkyl methacrylate esters and the higher $C_{15}$ to $C_{20}$ alkyl methacrylate esters. A commercial methacrylate copolymer of this type which is primarily a viscosity index improver corresponds to the formula in which $R^3$ represents about 32 wt. % lauryl, 28 wt. % butyl and 26 wt. % stearyl and 14 wt. % hexyl. The methacrylate ester copolymer is employed in the base oil ranging from 0.5 to 10 wt. %, preferably between about 1 and 5 wt. % based upon the oil composition, in order to impart the desired viscosity index and pour point. It is understood that other types of VI improvers can be employed.

As heretofore stated, a dispersant, preferably an ashless dispersant is generally present in the finished automatic transmission fluid. One such effective dispersant is the alkenyl succinimides characterized by the general formula:

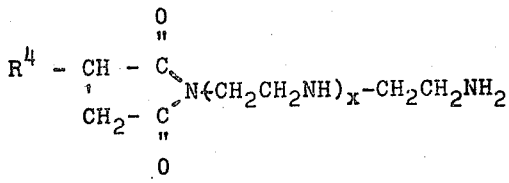

where $R^4$ is a large substantially monoolefinic aliphatic hydrocarbon radical of from 50 to 200 carbons and $x$ is an integer of from 1 to 10. Particularly suitable derivatives are the diethylene trimaine, triethylene tetramine, tetraethylene pentamine of polyisobutylene succinic anhydride, particularly where $R^4$ is between about 700 and 2,000, e.g., about 1,300 molecular weight.

These ashless dispersants are further described in U.S. Pat. No. 3,172,892 and 3,202,678.

Antioxidants are usually found in the fully formulated automatic transmission fluids. Effective antioxidants are the aryl substituted amine antioxidants exemplified by phenyl naphthyl amines, see U.S. Pat. No. 3,414,618 as well as compounds such as phenylene diamine, phenothiazine, diphenyl amine. Particularly preferred antioxidants are phenyl-alphanaphthylamine, and a mixture of 2,2'-diethyl-4,4'-dioctyl diphenylamine and 2,2'diethyl-4-t-octyldiphenylamine. These antioxidants further function as corrosion inhibitors in the finished transmission fluid. Other suitable antioxidants which also function as antiwear agents are the bis alkyl dithiothiadiazole such as 2,5-bis-octyl dithiothiadiazole.

Other valuable components contemplated in the finished compositions are the hydrocarbyl dithiophosphates which function principally as corrosion inhibitors, anti-wear and antioxidants. Particularly effective compounds in this class are the zinc di(nonylphenoxyethyl)-dithiophosphate, zinc di(dodecylphenoxyethyl) dithiophosphate, zinc di(nonylphenyl) dithiophosphate, zinc dioctyldithiophosphate, zinc dihexyldithiophosphate and zinc di-(nonylphenoxyethyl) dithiophosphate. In a typical preparation zinc di(nonylphenoxyethyl) dithiophosphate is prepared by reacting p-nonylphenoxyethanol with phosphorus pentasulfide followed by neutralization of the acid formed with a basic zinc compound, such as zinc carbonate, zinc oxide or zinc hydroxide. The general preparation and description of the compounds in this class is disclosed in U.S. Pat. Nos. 2,344,395 and 3,293,181. In use it is convenient to prepare a mineral oil solution of the zinc di($C_6$–$C_{15}$ alkylphenoxypolyoxyalkyl) dithiophosphate containing from between about 50 to 75 wt. % of the zinc salt. These salts not only function as corrosion inhibitors but act as oxidation inhibitors as well, particularly when employed in concentrations of between about 0.1 and 5 wt. % of the automatic transmission fluid composition.

Still other components contemplated are ashless antiwear agents to replace zinc dithiophosphates and demulsifiers such as the sodium alkyl or aryl sulfonates.

Antifoaming agents are conventionally employed in the automatic transmission fluids because the fluids are rapidly circulated in operation and air can be entrapped. For this purpose a silicone fluid of high viscosity such as dimethyl silicone polymer having a kinematic viscosity at 25°C. of about 1000 centistokes and above is preferably employed. A very satisfactory antifoam agent for this purpose is prepared by diluting 10 grams of dimethyl silicone polymer (1000 centistokes at 25°C.) with kerosene to provide a solution of 100 cs. From about 0.005 to 0.025 percent by weight of this concentrate is generally employed in the hydraulic fluid to provide from about 50 to 200 ppm of the silicone polymer based on the transmission fluid composition.

The following examples further illustrate the invention but are not to be construed as limitations thereof.

EXAMPLE I

This example illustrates a method of preparing the alkenyl succinic anhydride intermediate from which the succinamic and succinamic-succinimide mixture friction modifiers contemplated herein are derived.

Tetradecene-1 (1176 grams, 6 mole) and maleic anhydride (558 grams, 6 mole) were heated to reflux under nitrogen (179°C.) over a period of 4 hours during which the temperature was brought up to 230°C. The reaction mixture was kept at 230°C. for three-fourths hour. The solution was cooled and the unreacted starting material distilled at 130°–160°C. (25–50 mm Hg). The residue obtained weighed 1,643 grams (93 wt. % yield) and was identified by infrared, nuclear magnetic resonance, Iodine No., Saponification No. and molecular weight to be tetradecenyl succinic anhydride in an amount of about 90 wt. % and about 10 wt. % of an impurity of polymeric material.

EXAMPLE II

This example illustrates the preparation of the succinamic friction modifier.

Monoethanolamine in an amount of 61 grams (1 mole) was added to a slurry of 290 grams (1 mole) of n-tetradecenyl succinic anhydride prepared in Example I, 450 mls. of benzene and 300 grams of naphthenic oil of an SUS viscosity of about 100 at 100°F. Addition time was 10 minutes and the exotherm raised the temperature to about 60°C. The solution was then refluxed under nitrogen for 2 hours, cooled and filtered. The benzene was then removed by distillation (50°–70°C. at 25–50 mm Hg.) to give 609 grams of product (87 wt. % yield). The infrared nuclear magnetic resonance and total acid number analysis indicated the product (diluted in 50 wt. % oil) to be N-(2-hydroxyethyl)-n-tetradecenyl succinamic acid.

EXAMPLE III

This example further illustrates the preparation of the succinamic friction modifier component.

The procedure of Example II was essentially repeated. Monoethanolamine in an amount of 61 grams (1 mole) was slowly added to a slurry of n-tetradecenyl succinic anhydride (290 grams, 1 mole) in 350 grams of naphthenic lubricating oil of an SUS viscosity of about 100 at 100°F. Addition time was 15 minutes and the exotherm raised the temperature to about 60°C. The solution was then heated under nitrogen to 90°C. for 30 minutes, cooled and bottled. The product in an amount of 686 grams (98 wt. % yield) was found to be N-(2-hydroxyethyl)-n-tetradecenyl succinamic acid.

EXAMPLE IV

This example further illustrates the preparation of the succinamic friction modifier.

Utilizing the procedure of Example II, N-(2-hydroxyethyl)-n-dodecenyl succinamic acid was prepared from 61 grams (1 mole) of monoethanolamine and 262 grams (1 mole) of n-dodecenyl succinic anhydride.

EXAMPLE V

This example further illustrates the preparation of the succinamic friction modifier.

The procedure of Example II was repeated with the exception that t-dodecenyl succinic anhydride was substituted for the n-dodecenyl succinic anhydride. The product obtained was identified as N-(2-hydroxyethyl)-t-dodecenyl succinamic acid.

EXAMPLE VI

This example illustrates the preparation of the succinamic-succinimide friction modifier mixture.

Monoethanolamine in an amount of 183 grams (3 mole) was added slowly over a 20 minute period to a slurry of 870 grams (3 mole) of n-tetradecenyl succinic anhydride in 1,020 grams of naphthenic oil of an SUS viscosity of about 100 at 100°F. An exotherm raised the temperature to about 65°C. The resultant solution was then heated under nitrogen to 120°C. for 30 minutes, cooled and bottled. The product (2,023 grams — 97 wt. % yield) was identified by infrared, nuclear magnetic resonance and Total Acid No. to be about 50 wt. % of a 1:1 weight mixture of N-(2-hydroxyethyl)-n-tetradecenyl succinamic acid and N-(2-hydroxyethyl)-n-tetradecenyl succinimide, the remainder being essentially naphthenic oil.

EXAMPLE VII

This example further illustrates the preparation of the succinamic-succinimide mixture friction modifier.

Utilizing the procedure of Example VI, 268 grams (1 mole) of n-dodecenyl succinic anhydride was substituted for the n-tetradecenyl succinic anhydride. The product was indentified as a 50 wt. % 1:1 weight mixture of N-(2-hydroxyethyl)-n-dodecenyl succinamic acid and N-(2-hydroxyethyl)-n-dodecenyl succinimide in naphthenic oil.

EXAMPLE VIII

This example further illustrates the preparation of the succinimide and succinamic acid mixture.

The procedure of Example VI was repeated with the exception that 268 grams (1 mole) of t-dodecenyl succinic anhydride was substituted for the tetradecenyl succinic anhydired. The product was identified as a 50 wt. % 1:1 weight mixture of N-(2-hydroxyethyl)-t-dodecenyl succinamic acid and N-(2-hydroxyethyl)-t-dodecenyl succinimide in naphthenic oil.

EXAMPLE IX

This example illustrates the finished automatic transmission fluid compositions contemplated herein and further demonstrates their superiority in respect to resistance to friction modifier breakdown and/or shift quality.

The friction stable property and shift quality of the automatic transmission compositions of the invention and comparative compositions were respectively determined in the Dexron Low Energy Cycling Test T-12 known as the Dexron T-12 Test. A description of this test follows;

Dexron T-12 Test

The Dexron T-12 Test with minor variation is described in the General Motors Dexron Automatic Transmission Fluid Specification issued Apr., 1967. This test is conducted using a Chevrolet engine with its corresponding Powerglide transmission mounted on a test stand in such a manner that the power output is absorbed by a Dynamatic 1519 eddy current dynamometer and an auxiliary inertia wheel increasing total system inertia to 17.54 lb.ft./sec.$^2$. The automatic transmission fluid is maintained at a temperature of about 275°F. The fluid must have a test life of at least 225 hours to pass this qualifying test. Test life of 400 or more hours represents premium friction qualifying properties.

The transmission fluid under test is used to fill the Powerglide transmission and is tested by running the engine and transmission in a continuous series of 90 second cycles each consisting of 4 phases as follows: acceleration for 13.8 seconds open throttle power with upshift occurring at approximately 12–13 seconds after start, deceleration for 8.3 seconds power off (closed throttle) coast down in the top gear (no downshift), acceleration for 9.0 seconds power on (immediate force to kickdown to low), followed by upshift approximately 9 seconds after start, and deceleration for 58.3 second power off. This sequence is continued until shift failure (excessive clutch slippage, upshift time over 0.9 seconds or abnormal shift).

The quality of shifting is determined as follows: at the time of upshift, the actual shifting is normally smoothly accomplished in about 0.4 seconds. After a period of essentially uniform shift time and smooth operation, the shifting becomes erratic or the shifting period begins to approach 0.8 to 0.9 seconds. The quality of shifting is then markedly deteriorated and the duration of smooth shifting has ended. The determination of shift smoothness is made both through its audible effect and by measurement at occasional interviews of torque changes with single cycles as clutch engagement proceeds.

The fully formulated formulations representative of the invention and comparative formulations together with their test results are set forth below in Table I:

TABLE I

TRANSMISSION FLUID COMPOSITION AND TESTING

| Composition, Wt. % | A | B | C | D | E | F |
|---|---|---|---|---|---|---|
| Mineral Oil (100 SUS at 100°F.) | 90.7 | 90.7 | 90.7 | 91.4 | 91.4 | 90.7 |
| Diethyl-t-(mono & di) octyldiphenylamine | 0.6 | 0.6 | 0.6 | 0.6 | 0.6 | 0.6 |
| Zinc Dialkylphenyldithiophosphate | 0.8 | 0.8 | 0.8 | 0.8 | 0.8 | 0.8 |
| Polyisobutylene (~1200 m.w.) succinimide of tetraethylene pentamine | 1.0 | 1.0 | 1.0 | 1.0 | 1.0 | 1.0 |
| Tetrapolymer of butyl, lauryl, stearyl and dimethylaminoethyl methacrylate | 6 | 6 | 6 | 6 | 6 | 6.0 |
| Sodium Sulfonate | 0.5 | 0.5 | 0.5 | — | — | 0.5 |
| Bis octyl Dithiothiadiazole | 0.2 | 0.2 | 0.2 | — | — | 0.2 |
| Silicone Antifoam | ←————————— 150 PPM —————————→ | | | | | |
| Red Dye | ←————————— 128 PPM —————————→ | | | | | |
| Friction Modifier | | | | | | |
|   Amic[1] | 0.2 | 0.2 | — | — | — | — |
|   Amic-Imide[2] | — | — | 0.2 | — | — | — |
|   Imide[3] | — | — | — | 0.2 | — | — |
|   Aspartamide[4] | — | — | — | — | 0.2 | — |
|   N-oleyl sarcosine | — | — | — | — | — | 0.2 |
| Tests | | | | | | |
| Dexron T-12, Hrs. to Fail | 433 | 422 | 460 | 300 | 352 | 293 |

1. N-(2-hydroxyethyl)-n-tetradecenylsuccinamic acid - 1:1 wt. ratio. 2. N-(2-hydroxyethyl)-n-tetradecenylsuccinamic acid and N-(2-hydroxyethyl)-n-tetradecenyl succinimide. 3. N-(2-hydroxyethyl)-n-tetradecenyl succinimide. 4. N,N'-di-$C_{15}$-$C_{20}$ sec. alkyl aspartic acid amide.

As can be seen from the above table, representative Compositions A, B and C are substantially superior to analogous comparative Compositions D, E and F in respect to friction modifier stability as measured by the number of hours to failure in the Dexron T-12 Test. Both N-oleyl sarcosine and aspartamides are well known in the art and in the literature as effective friction modifiers.

We claim:

1. A method for operating an automatic transmission which comprises supplying to said transmission a lubricating oil composition comprising at least about 85 wt. % of a mineral lubricating oil and between about 0.01 and 5 wt. % of a friction modifier selected from the group consisting of N-(hydroxyalkyl) alkenyl succinamic acid characterized by the formula:

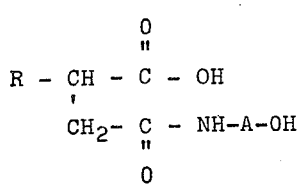

and a mixture of said succinamic acid and N-(hydroxyalkyl) alkenyl succinimide characterized by the formula:

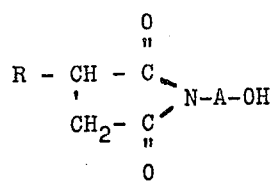

where R is alkenyl of from 10 to 30 carbons and A is a divalent aliphatic hydrocarbon radical of from 1 to 6 carbons, said succinamic to succinimide weight ratio is said mixture of between about 1:0.01 and 1:1.

2. A method for operating an automatic transmission which comprises supplying to said transmission a lubricating composition in accordance with claim 1 wherein said friction modifier is said succinamic acid and said succinamic acid is N-(2-hydroxyethyl)-n-tetradecenyl succinamic acid.

3. A method for operating an automatic transmission which comprises supplying to said transmission a lubricating composition in accordance with claim 1 wherein said friction modifier is said mixture and said succinamic acid is N-(2-hydroxyethyl)-n-tetradecenyl succinamic acid and said succinimide is N-(2-hydroxyethyl)-n-tetradecenyl succinimide and where the succinamic to succinimide weight ratio in said mixture is about 1:1.

* * * * *